US012780222B2

(12) United States Patent
Stein

(10) Patent No.: US 12,780,222 B2
(45) Date of Patent: Nov. 3, 2026

(54) FLEXIBLE TRACK FOR SENSOR CALIBRATION OF AN AUTONOMOUS VEHICLE

(71) Applicant: Torc Robotics, Inc., Blacksburg, VA (US)

(72) Inventor: Fridtjof Stein, Baden-Wurttemberg (DE)

(73) Assignee: Torc Robotics, Inc., Blacksburg, VA (US)

(*) Notice: Subject to any disclaimer, the term of this patent is extended or adjusted under 35 U.S.C. 154(b) by 7 days.

(21) Appl. No.: 19/187,705

(22) Filed: Apr. 23, 2025

(65) Prior Publication Data

US 2026/0336639 A1 Oct. 29, 2026

(51) Int. Cl.

| | |
|---|---|
| ***B60W 50/00*** | (2006.01) |
| ***B60W 60/00*** | (2020.01) |
| ***G01S 7/40*** | (2006.01) |
| ***G01S 7/497*** | (2006.01) |
| ***G01S 13/931*** | (2020.01) |

(Continued)

(52) U.S. Cl.

CPC .. *B60W 50/0098* (2013.01); *B60W 60/00186* (2020.02); *G01S 7/40* (2013.01); *G01S 7/497* (2013.01); *G01S 13/931* (2013.01); *G01S 17/931* (2020.01); *G06T 7/80* (2017.01); *B60W 2050/0083* (2013.01); *B60W 2420/40* (2013.01); *B60W 2420/408* (2024.01); *B60W 2720/10* (2013.01); *G06T 2207/10048* (2013.01); *G06T 2207/30252* (2013.01)

(58) Field of Classification Search

CPC ....... B60W 50/0098; B60W 60/00186; B60W 2420/408; B60W 2050/0083; B60W 2420/40; B60W 2720/10; G06T 7/80; G06T 2207/10048; G06T 2207/30252; G01S 17/931; G01S 7/40; G01S 7/497; G01S 13/931

See application file for complete search history.

(56) References Cited

U.S. PATENT DOCUMENTS

| | | | | |
|---|---|---|---|---|
| 10,788,316 | B1 | 9/2020 | Kalscheur | |
| 10,942,045 | B1 * | 3/2021 | Crawford | G01D 11/30 |

(Continued)

FOREIGN PATENT DOCUMENTS

| | | | |
|---|---|---|---|
| DE | 102020005762 | A1 | 3/2022 |

*Primary Examiner* — Gertrude Arthur Jeanglaude

(74) *Attorney, Agent, or Firm* — McCarter & English, LLP

(57) ABSTRACT

A sensor calibration area includes a calibration track extending over a longitudinal length and on which an autonomous vehicle can operate; a first side strip extending longitudinally on a first side of the calibration track; a second side strip extending longitudinally on a second side of the calibration track; a first set of calibration boards and a second set of calibration boards positioned on the first side strip and the second side strip, respectively; an autonomous vehicle detector circuit configured to detect presence of the autonomous vehicle and generate a signal indicating the presence of the autonomous vehicle; a sensor to determine a type of the autonomous vehicle; and a calibration board selector circuit configured to activate at least one calibration board of the first set of calibration boards or the second set of calibration boards for calibration of a plurality of perception sensors mounted on the autonomous vehicle.

20 Claims, 10 Drawing Sheets

(51) Int. Cl.
*G01S 17/931* (2020.01)
*G06T 7/80* (2017.01)

(56) References Cited

U.S. PATENT DOCUMENTS

| | | | | |
|---|---|---|---|---|
| 11,269,066 | B2 | 3/2022 | Cardei et al. | |
| 11,634,153 | B2 | 4/2023 | Grabe et al. | |
| 11,940,568 | B2 | 3/2024 | Laverne | |
| 11,945,467 | B2 | 4/2024 | Grabe et al. | |
| 12,078,760 | B2 | 9/2024 | Cardei et al. | |
| 12,116,009 | B2 | 10/2024 | Jatt et al. | |
| 12,461,213 | B2 * | 11/2025 | Li | G01S 17/931 |
| 2017/0343654 | A1 * | 11/2017 | Valois | G01S 17/08 |
| 2020/0111364 | A1 | 4/2020 | Damsaz et al. | |
| 2020/0209867 | A1 | 7/2020 | Valois et al. | |
| 2020/0210715 | A1 | 7/2020 | Golomedov et al. | |
| 2020/0348403 | A1 * | 11/2020 | Valois | G01S 17/931 |
| 2021/0152997 | A1 | 5/2021 | Manivasagam et al. | |
| 2021/0318444 | A1 | 10/2021 | Li et al. | |
| 2022/0024484 | A1 | 1/2022 | Armstrong-Crews | |
| 2022/0028262 | A1 | 1/2022 | Devassy et al. | |
| 2023/0213646 | A1 | 7/2023 | John Wilson et al. | |
| 2023/0252678 | A1 | 8/2023 | Muhassin et al. | |
| 2023/0252896 | A1 | 8/2023 | Xu et al. | |
| 2024/0182065 | A1 | 6/2024 | Grabe et al. | |

* cited by examiner

FLEXIBLE TRACK FOR SENSOR CALIBRATION OF AN AUTONOMOUS VEHICLE

TECHNICAL FIELD

The field of the disclosure relates to an autonomous vehicle and, more specifically, methods for sensor calibration of an autonomous vehicle using a flexible track.

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data or Global N avigation Satellite Systems (GNSS) data. Behaviors and planning (or behaviors and motion planning (BMP)) technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Localization technologies for determining a current location of an autonomous vehicle are based on map data and sensor data of sensors such as Light Detecting and Ranging (LiDAR) sensors, Radio Detection and Ranging (RADAR) sensors, camera sensors. Further, based upon the driving behavior of other traffic participants such as, speed, trajectory, etc., driving behavior of the autonomous vehicle is adjusted. Accordingly, sensors installed in the autonomous vehicle for localization technologies need to be precisely calibrated based upon the sensor type and sensor design.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a sensor calibration area is disclosed. The sensor calibration area includes a calibration track extending over a longitudinal length and on which an autonomous vehicle can operate, a first side strip extending longitudinally on a first side of the calibration track, a second side strip extending longitudinally on a second side of the calibration track, a first set of calibration boards positioned on the first side strip, a second set of calibration boards positioned on the second side strip, an autonomous vehicle detector circuit configured to detect presence of the autonomous vehicle and generate a signal indicating the presence of the autonomous vehicle, a sensor to determine a type of the autonomous vehicle, and a calibration board selector circuit configured to activate at least one calibration board of the first set of calibration boards or at least one calibration board of the second set of calibration boards for calibration of a plurality of perception sensors mounted on the autonomous vehicle.

In another aspect, an autonomous vehicle including a plurality of perception sensors, at least one memory configured to store machine-executable instructions, and at least one processor communicatively coupled with the at least one memory is disclosed. The at least one processor is configured to execute the machine-executable instructions to (i) stop the autonomous vehicle at a marked area in a sensor calibration area for activating one or more calibration boards of a first set of calibration boards and one or more calibration boards of a second set of calibration boards to calibrate the plurality of perception sensors; (ii) drive the autonomous vehicle at a predetermined speed on a calibration track having the first set of calibration boards positioned on a first side strip on a first side of the calibration track and the second set of calibration boards positioned on a second side strip on a second side of the calibration track, wherein the calibration track is in the sensor calibration area; and (iii) collect data being displayed on the first or the second set of calibration boards using the plurality of perception sensors for calibration of the plurality of perception sensors.

In yet another aspect, a computer-implemented method is disclosed. The computer-implemented method includes positioning an autonomous vehicle at a marked area in a sensor calibration area for activating one or more calibration boards of a first set of calibration boards and one or more calibration boards of a second set of calibration boards for calibration of a plurality of perception sensors of the autonomous vehicle; driving the autonomous vehicle at a predetermined speed on a calibration track in the sensor calibration area having the first set of calibration boards positioned on a first side strip on a first side of the calibration track and the second set of calibration boards positioned on a second side strip on a second side of the calibration track; and collecting data being displayed on the first or the second set of calibration boards using the plurality of perception sensors for calibration of the plurality of perception sensors.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
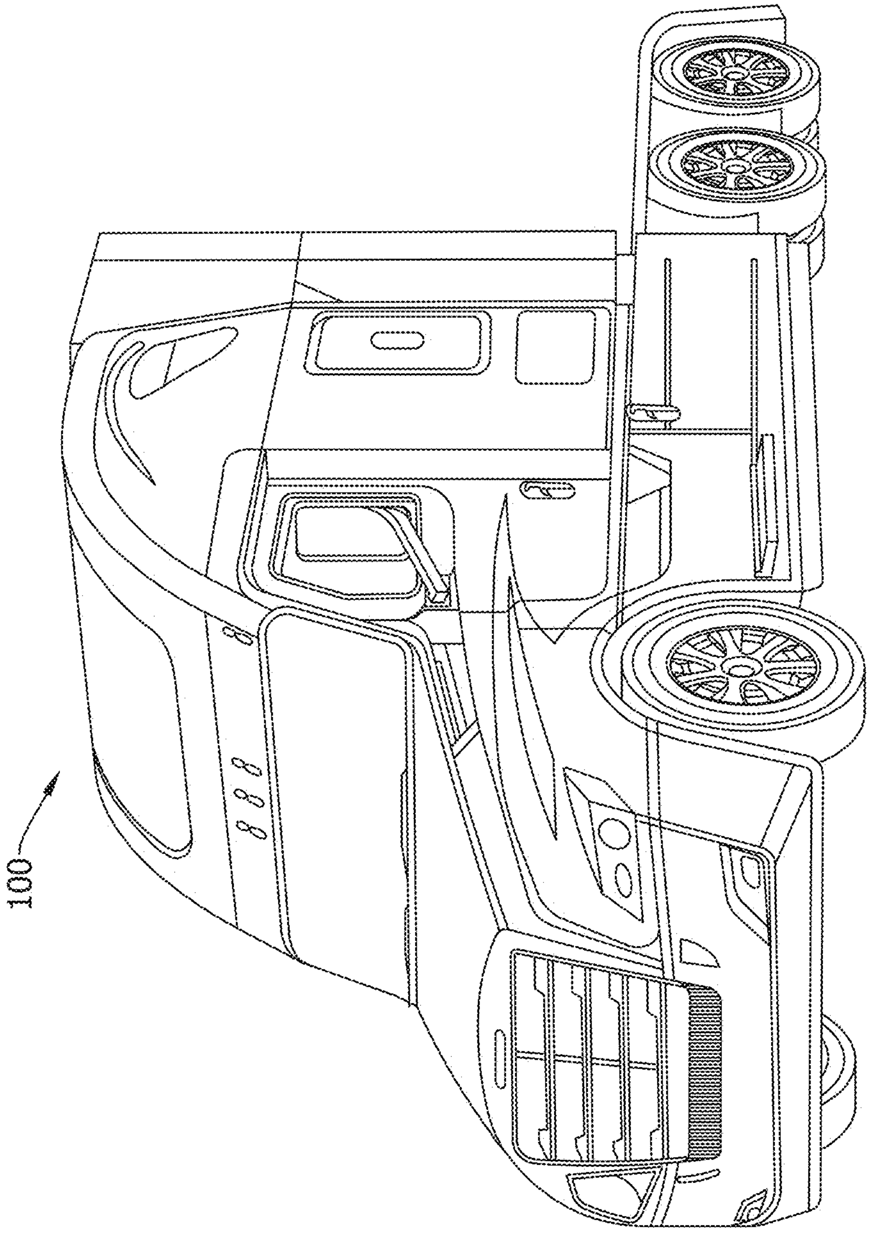
FIG. 1. is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments, and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NH TSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, as described in the present disclosure, refers to one or more application servers, and one or more database servers communicatively coupled with each other and one or more autonomous vehicles of a fleet. Mission control receives sensor data collected by one or more sensors of the one or more autonomous vehicles of the fleet and transmit data including, but not limited to, trajectory data, described herein, to the one or more autonomous vehicles of the fleet.

As described herein, various sensor parameters of the sensors of the automobile vehicle require to be precisely determined for accurate or precise correlation of sensor data. For example, camera sensor parameters include internal parameters or external parameters such as, baseline width, focal length, field of view, pixel density, aberrations, and sensor type (color or monochrome), etc. Determining these internal parameters or external parameters beforehand through calibration is required for generating and processing sensor data.

A general rule for calibration of the sensors is to have the calibration space be the same as the measurement space. In the context of automobiles, and in particular, autonomous vehicles, the forward-looking range generally extends from "directly in front of the bumper" up to 200 meters. However, having 200 meters or so of space in the automotive assembling environment, at the end of the assembly line or in a workshop, is challenging due to space constraints. However, various embodiments, as described herein, provides solutions for the space constraints, and therefore, an autonomous vehicle can precisely calibrate its sensors before departing for a target destination.

As described herein, different types of sensors require different types of targets for calibration. For examples, thermal sensors require calibration targets emitting higher or lower temperatures, or RADAR sensors require calibration targets formed as retroreflectors. Accordingly, embodiments in the present disclosure provide solutions or address issues related to environmental conditions that are specific to each sensor. For example, a camera sensor, such as a near infrared (NIR) camera sensor, a short-wave infrared (SWIR) camera sensor, or a visible light camera sensor, may require a solution for image capturing at night time, or image capturing for objects that are farther away in a poor lighting environment, while a long wave infrared (LWIR) or thermal camera sensor may require thermal illumination for calibration. In addition to different environmental conditions required for calibration of different types of sensors, different autonomous vehicles may use different brands or different generations of sensors, and therefore these sensors may have different calibration requirements. While various embodiments in the present disclosure are described for calibration of front-facing sensors, the techniques described herein may also be applied for rear-facing or side-facing sensors.

FIG. 1 illustrates a vehicle 100, such as a truck that may be conventionally connected to a single or tandem trailer to transport the trailer (not shown in FIG. 1) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown in FIG. 1) of the vehicle 100 based on data collected by a sensor network (not shown in FIG. 1) including one or more sensors. The vehicle 100 may be an ego vehicle referenced herein.

Figure 2:
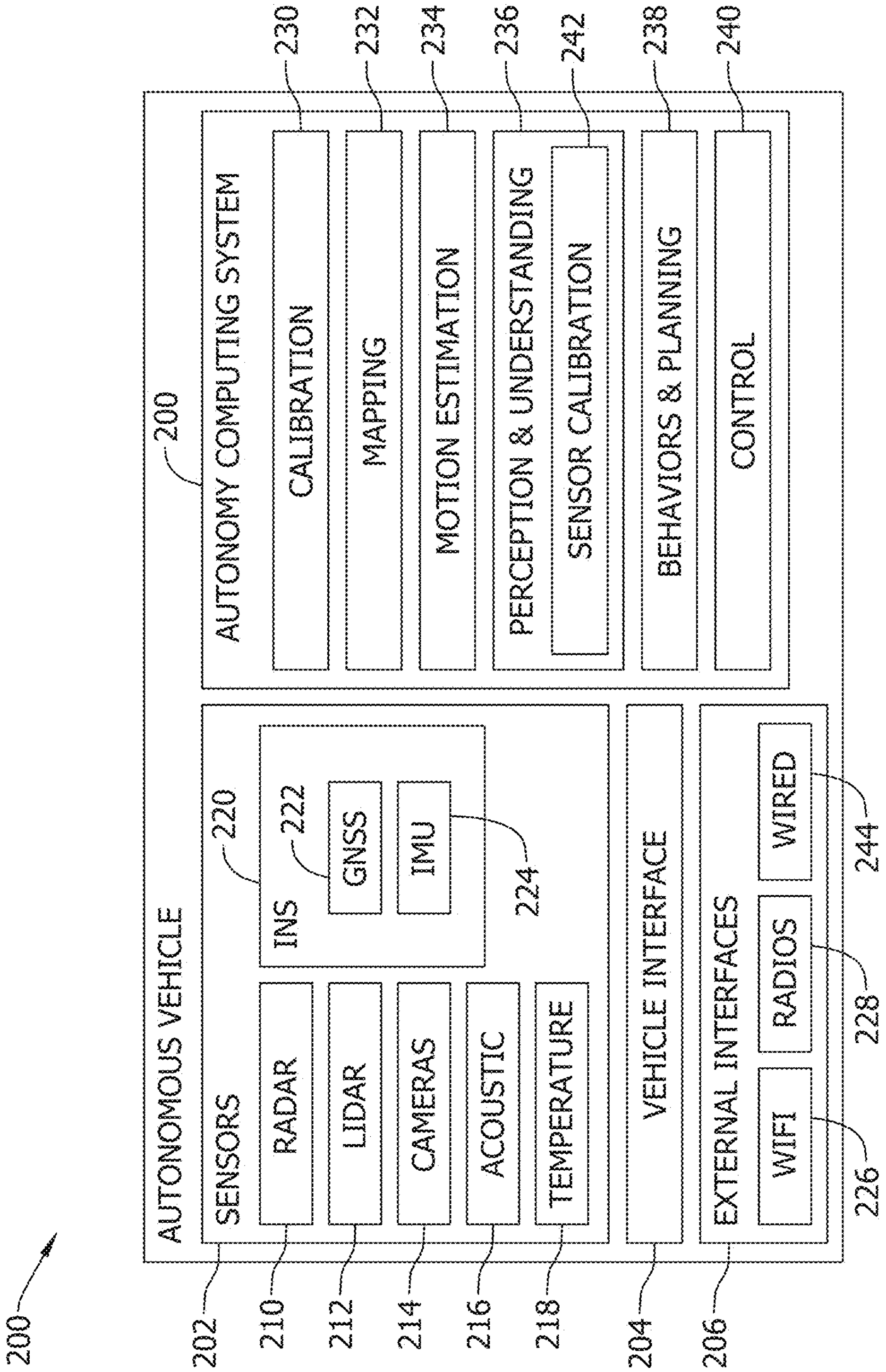
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, and navigation sensors. Navigation sensors, as described herein, may be one or more inertial navigation system (INS) sensors (or systems) 220, one or more global navigation satellite system (GNSS) receivers 222, or one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or mission control (a hub) or both.

Cameras 214 may have temperature sensors 218 (e.g., one or more of negative temperature coefficient (NTC) thermistors, resistance temperature detectors (RTDs), thermocouples, or semiconductor-based integrated (IC) sensors) positioned on an external surface, or an internal surface, or both, to measure temperature on a camera lens surface of each of cameras 214. Additionally, temperature sensors 218 may be positioned on other areas of the autonomous vehicle 100, e.g., to measure ambient temperature.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment. Additionally, or alternatively, GNSS receiver 222 may be configured to receive RTK and GNSS position information from satellite-based systems.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a sensor calibration module 242. The sensor calibration module 242, for example, may be embodied within another module, such as calibration module 230, perception and understanding module 236, behaviors and planning module 238, or separately. These modules may be implemented in dedicated hardware such as, for example, an application specific integrated circuit (A SIC), field programmable gate array (FPGA), or microprocessor, or implemented as executable software modules, or firmware, written to memory and executed on one or more processors onboard autonomous vehicle 100. The sensor calibration module 242 is configured to calibrate sensors such as, cameras 214, LiDAR sensors 212, or RADAR sensors 210.

Figure 3:
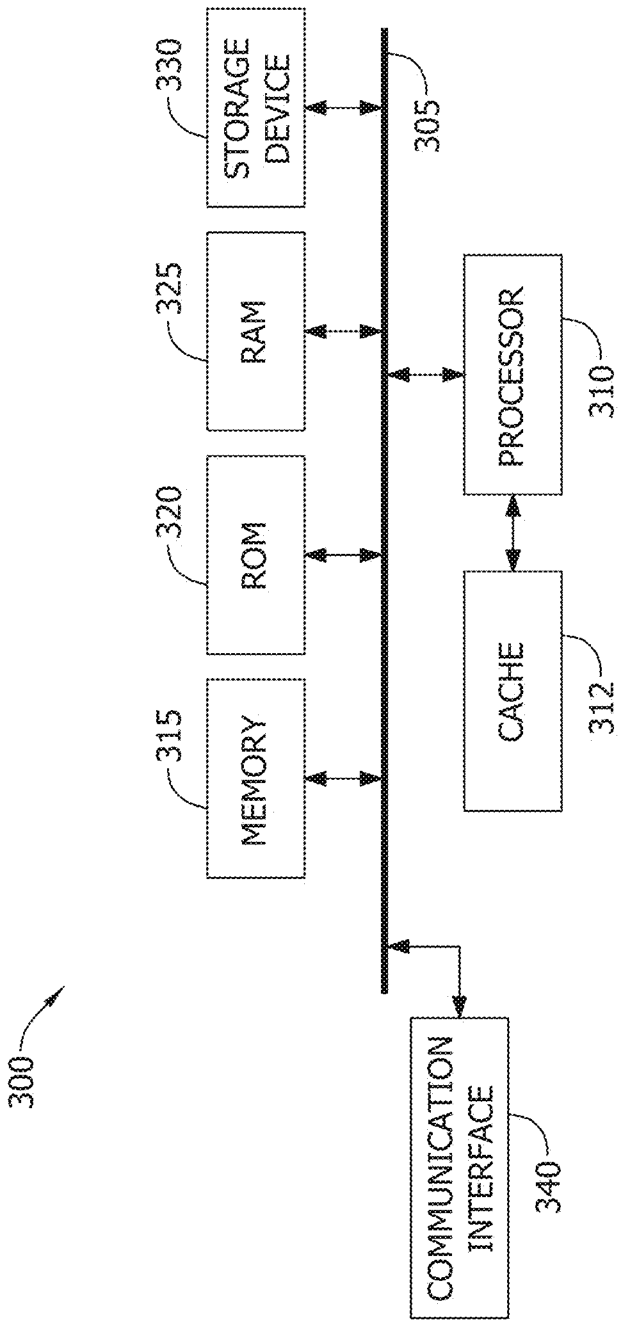
FIG. 3 is a block diagram of an example computing system.

FIG. 3 illustrates an example computing system 300 that can implement various techniques, processes, functions, or methods described herein. Computing system 300 may be embodied within, for example, autonomous vehicle 100 shown in FIG. 1, such as autonomy computing system 200 shown in FIG. 2. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random-access memory (RA M) 325, to processor 310.

The processor 310 may be communicatively coupled with a communication interface 340 to communicate with external entities such as, mission control, or one or more other vehicles using V2V communication. Accordingly, the communication interface 340 may include one or more of a radio interface, an electronic sign board mounted on autonomous vehicle 100, a public address system or a loudspeaker positioned at autonomous vehicle 100. The radio interface may be configured for at least one of: (i) a vehicle-to-vehicle communication technique, (ii) citizens band radio frequencies; (iii) a Bluetooth signal; and (iv) a short message service (SM S) technology.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general-purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 4:
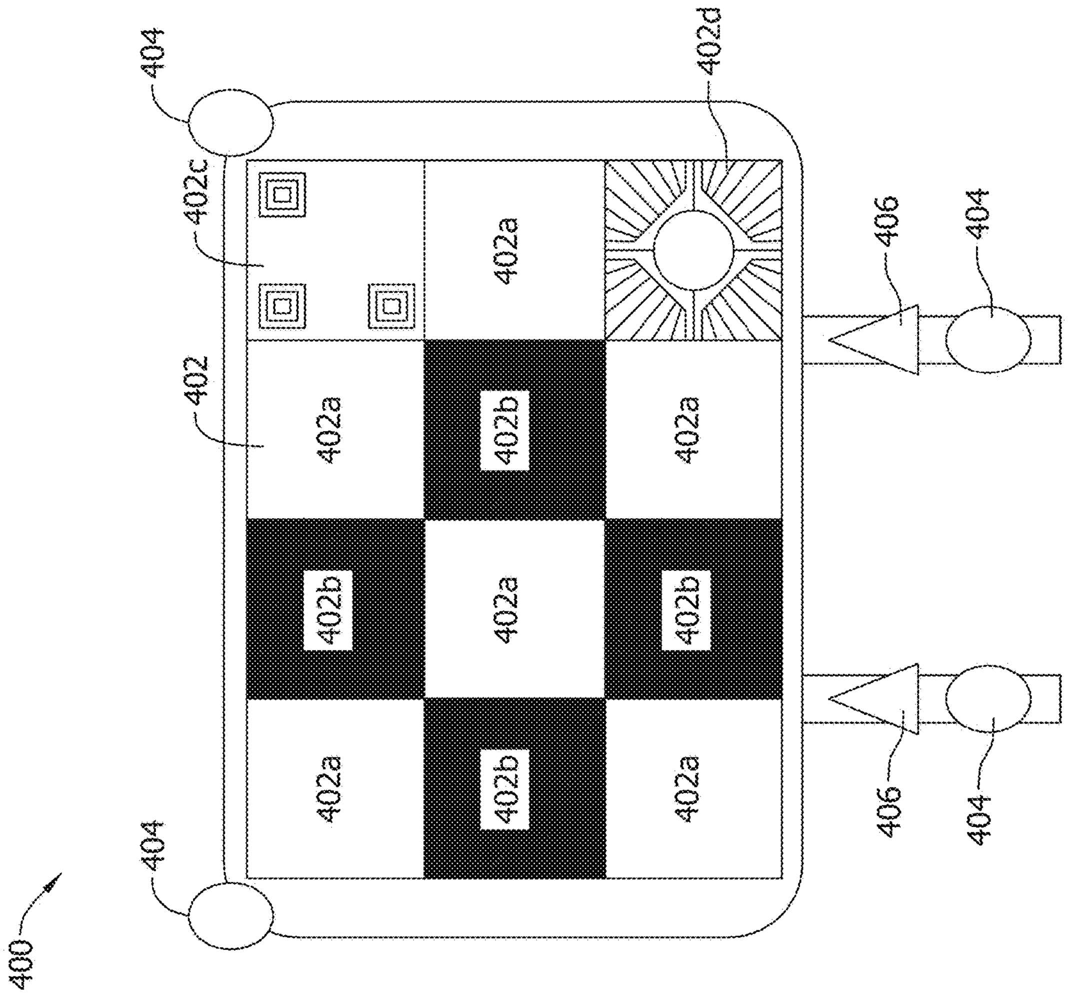
FIG. 4 illustrates an example calibration board.

FIG. 4 illustrates an example calibration board 400. The calibration board 400 may include a checkered box pattern (also referenced as a checkerboard pattern) 402. By way of an example, the checkered box pattern 402 may include a first set of boxes having a first color (e.g., white) shown in FIG. 4 as 402*a*, a second set of boxes having a second color (e.g., black) shown in FIG. 4 as 402*b*, a third set of boxes (or at least one box) shown in FIG. 4 as 402*c* and having a machine-readable image such as, a Quick Response (QR) code, or a barcode, etc., and a fourth set of boxes (or at least one box) shown in FIG. 4 as 402*d* and having a unique graphic design or pattern. While an example calibration pattern is shown in FIG. 4, other calibration patterns including, but not only limited to, a circle grid pattern, ChArUco board pattern, AprilGrid pattern, or a custom board pattern, may also be used for display on the calibration board 400 for calibrating an image sensor. The calibration pattern on the calibration board provides a known geometric structure (corners of squares) that allows algorithms to estimate camera intrinsic parameters (like focal length and distortion coefficients) and extrinsic parameters (camera position and orientation). The QR code or the barcode may include information such as, current location of the calibration area, a calibration track number, etc.

In some examples, a particular calibration pattern displayed on the calibration board 400 may be dynamically updated based upon one or more of the types of sensors being calibrated, the type and model of the autonomous vehicle. While the calibration pattern displayed on the calibration board 400 may be used for calibration of image sensors, the calibration board 400 may also be equipped with markers for calibrating RADAR sensors or LiDAR sensors. In the example shown in FIG. 4, markers for LiDAR calibration may be mounted or positioned on the calibration board 400 as shown in FIG. 4 as 404. Similarly, markers for RADAR calibration may be mounted or positioned on the calibration board 400 as shown in FIG. 4 as 406. Markers for LiDAR calibration 404 include a series of reflective targets arranged in a known pattern, which allows the LiDAR sensor to capture the reflection and compare the received reflected signals against the expected pattern to adjust and verify the LiDAR sensor's scanning accuracy. Similarly, markers for RADAR calibration 406, which are represented herein as corner reflectors, are the optimal RADAR targets positioned at known distances. Marked for RADAR calibration 406 thus enables the RADAR sensor to send and receive (reflected) signals and adjust readings of the RADAR sensor to ensure accuracy in positioning measurements.

Additionally, the calibration board 400 may be positioned on the ground in a vertical position or a horizontal position. In some examples, more than one calibration board may be used in a sensor calibration area each and each calibration board may have the same calibration pattern or a different calibration pattern. Further, the calibration boards may be placed or positioned in the sensor calibration area at a specific distance apart from each other. Further, the calibration boards may be placed or positioned in the calibration area on one side or both sides of a driving area (also referenced herein as a calibration track) in the sensor calibration area. Additionally, the number of calibration boards may be updated based upon the type and model of the autonomous vehicle.

Accordingly, the calibration area, as described herein, may be completely or partially flexible in which the total number of calibration boards, a respective position of each calibration board in the calibration area, a calibration pattern on each calibration board in the calibration area may be updated based upon one or more of the types of sensors being calibrated, the type and model of the autonomous vehicle. Further, the area on each calibration board may also be updated.

Additionally, each calibration board may be illuminated using an internal illuminator that is a built-in illuminator of the calibration board, or an external illuminator illuminating the calibration board. For example, the external illuminator may illuminate the calibration board using NIR or SW IR or other visible light spectrum, and the built-in illuminator may employ heating elements that allow calibration of sensors operating in the LW IR spectrum.

In some examples, all calibration boards may be activated simultaneously. Alternatively, a first subset of calibration boards may be activated followed by a second subset of calibration boards based upon position or movement of the autonomous vehicle in the calibration area.

Figure 5A:
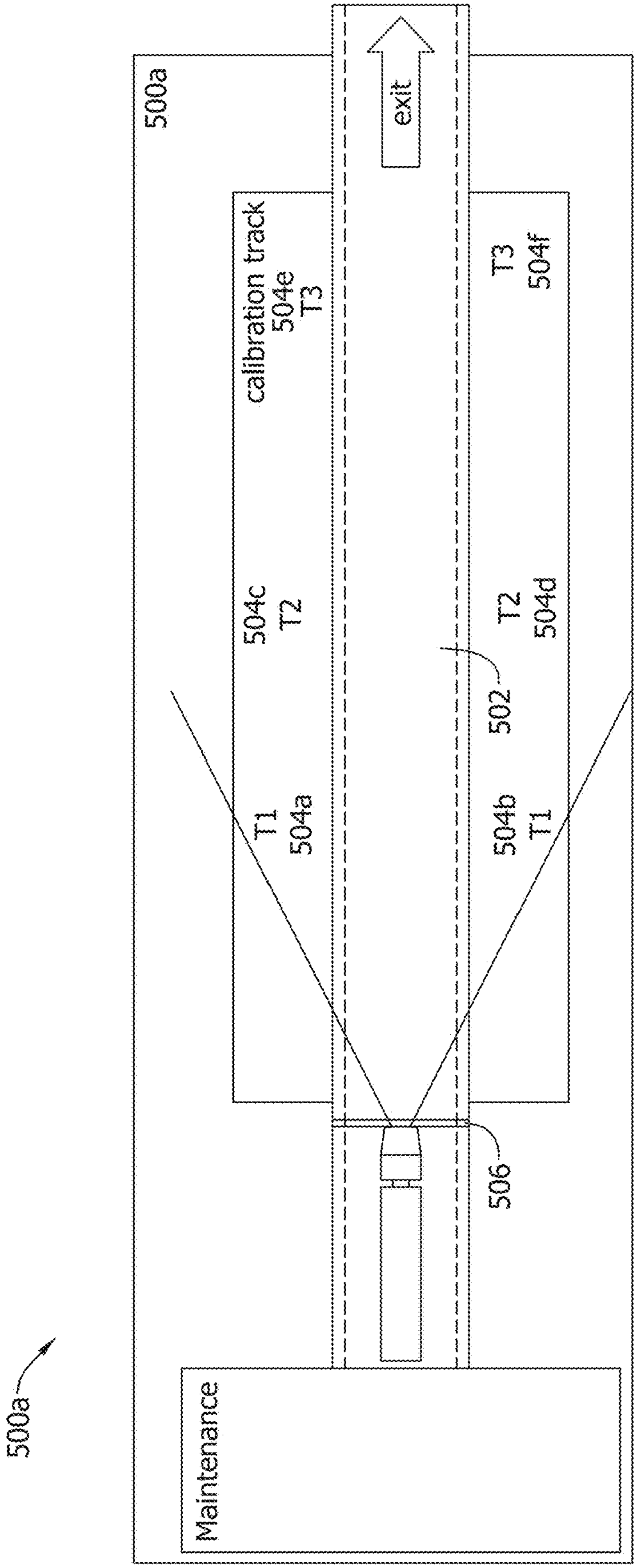
FIG. 5A illustrates an example of a calibration area.

FIG. 5A is one example of a calibration area 500*a*. The calibration area 500*a* includes a calibration track 502, a plurality of calibration boards including calibration boards 504*a*-504*f*. When the autonomous vehicle approaches a location 506, or a line, the one or more calibration boards of the plurality of calibration boards 504*a*-504*f* may be activated as described herein. The calibration area 500*a* may be at the mission control, a truck hub, a truck shop, or at rest area on the highway.

Figure 5B:
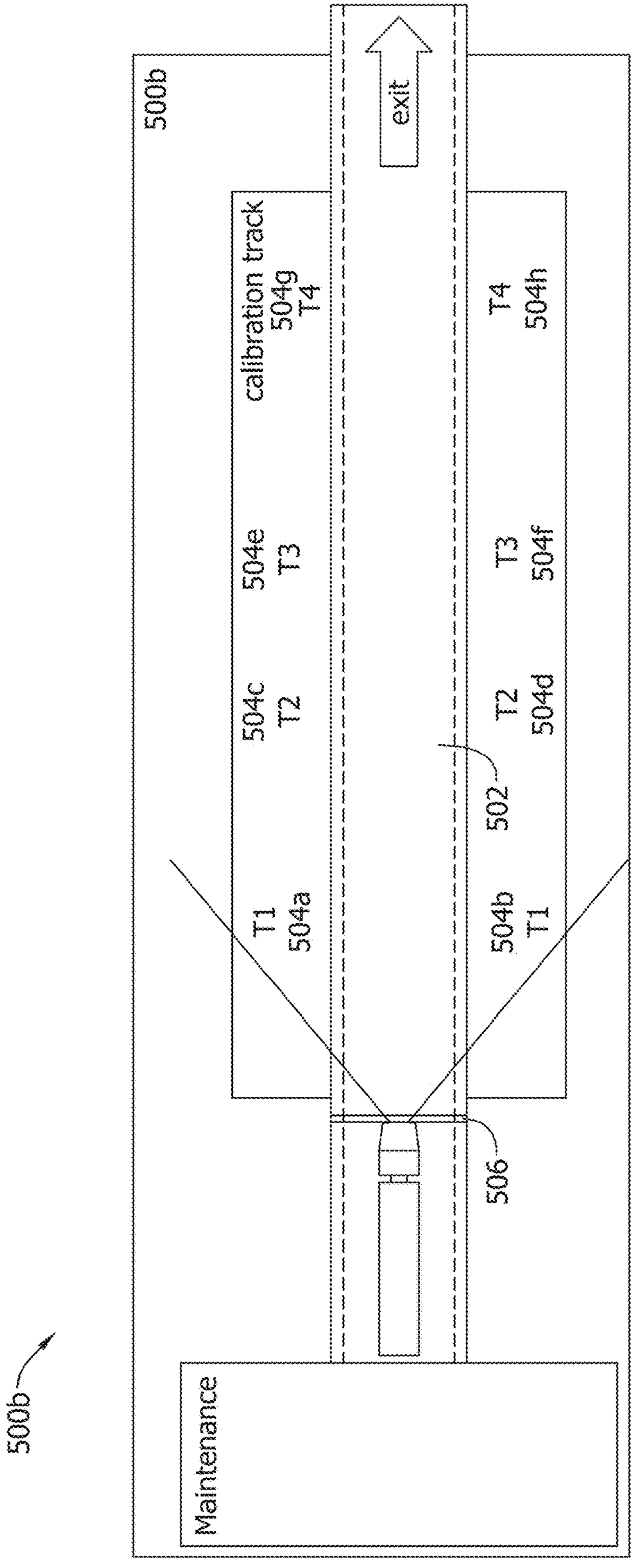
FIG. 5B illustrates another example of a calibration area.

FIG. 5B is another example of a calibration area 500*b* with an increased number of calibration boards. The calibration area 500*b* includes a calibration track 502, a plurality of calibration boards including calibration boards 504*a*-504*h*. When the autonomous vehicle approaches a location 506, or a line, the one or more calibration boards of the plurality of calibration boards 504*a*-504*h* may be activated as described herein. The calibration area 500*b* may be at the mission control, a truck hub, a truck shop, or at rest area on the highway.

The first set of calibration boards (e.g., calibration boards 504*a*, 504*c*, 504*e*, and/or 504*g* shown in FIGS. 5A-5B) may be positioned on a first side strip and the second set of calibration boards (e.g., calibration boards 504*b*, 504*d*, 504*f*, and/or 504*h* shown in FIGS. 5A-5B). may be positioned on a second side strip. The first side strip may be on one side of the calibration track 502, and the second side strip may be on another side of the calibration track 502. Each calibration board of the first set of calibration boards is positioned apart from other calibration boards of the first set of calibration boards. Similarly, each calibration board of the second set of calibration boards is positioned apart from other calibration boards of the second set of calibration boards.

Further, each calibration board of the first set of calibration boards or the second set of calibration boards is positioned at a different distance away from the calibration track 502 such that one calibration board does not obstruct any other calibration board from a starting location 506 of the calibration track. Additionally, each calibration board of the first set of calibration boards or the second set of calibration boards is positioned in a vertical standing position or a horizontal laying position. A calibration board of the first set of calibration boards or the second set of calibration boards may have a specific pattern, for example, a checkerboard box pattern as shown in FIG. 4.

Further, the calibration board may include a machine-readable image identifying a current location of the sensor calibration area and/or a calibration track number. The machine-readable image may be displayed or printed on the calibration board. The calibration board may also have one or more targets for calibrating a LiDAR sensor or a RADAR sensor mounted on the autonomous vehicle. The calibration board may thus be used for calibrating an imaging sensor mounted on the autonomous vehicle. The imaging sensor may be a near infrared (NIR) camera sensor, a short-wave infrared (SWIR) camera sensor, or a long wave infrared (LWIR) camera sensor, or a thermal camera sensor.

Figure 6:
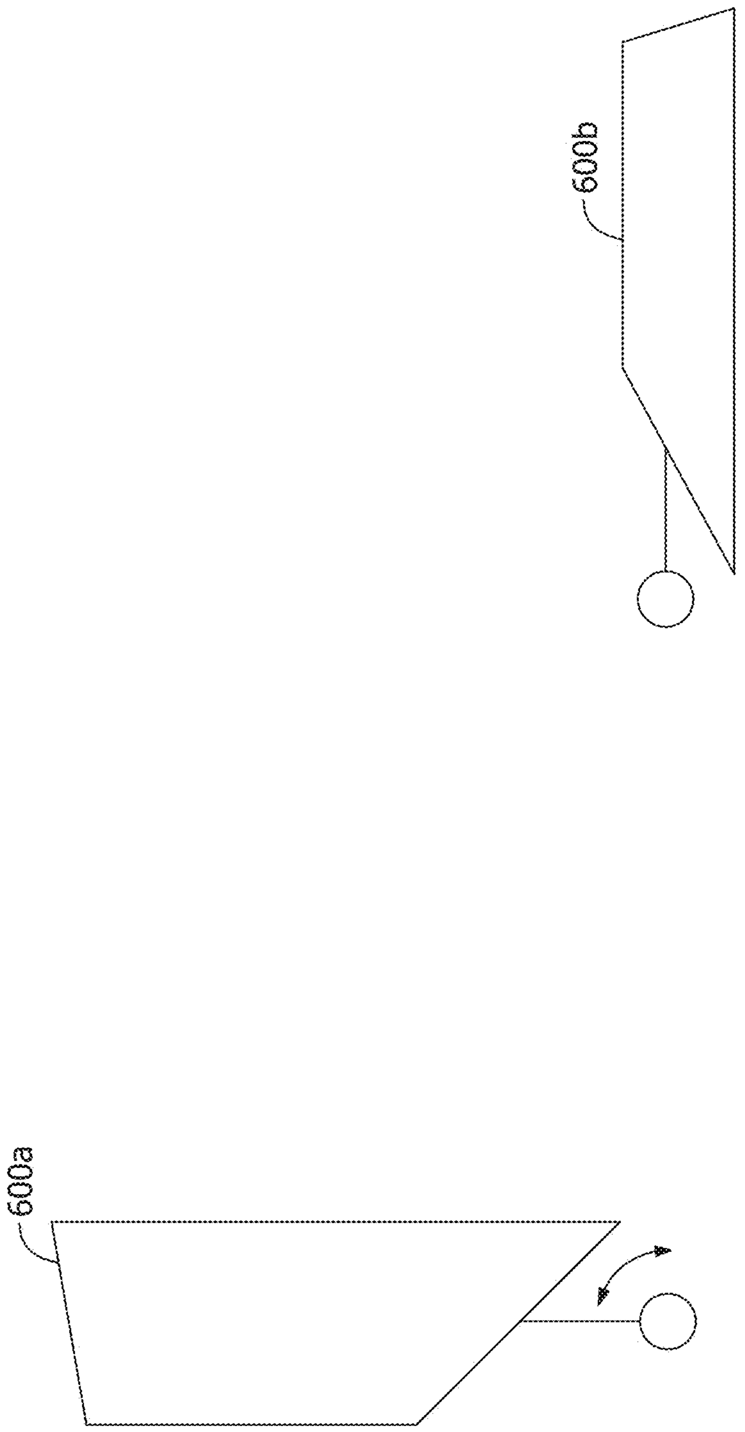
FIG. 6 illustrates two different examples positions for a calibration board shown in FIG. 4.

FIG. 6 illustrates two different example positions 600*a* and 600*b* for a calibration board 400 shown in FIG. 4 (or any calibration board 504*a*-504*f* shown in FIG. 5A or any calibration board 504*a*-504*h* shown in FIG. 5B). The calibration board 400 shown in FIG. 4 may be positioned in the calibration area 500*a* or 500*b* shown in FIG. 5A or FIG. 5B, respectively, in one of example positions 600*a* and 600*b*. Additionally, a subset of the calibration boards 504*a*-504*f* or 504*a*-504*h* may be according to an example position 600*a* and remaining calibration boards may be according to an example position 600*b*. Further, the position of each calibration board may be adjustable in one of the example positions 600*a* and 600*b* depending on the make and model of the autonomous vehicle and/or type of sensors being calibrated.

Figure 7:
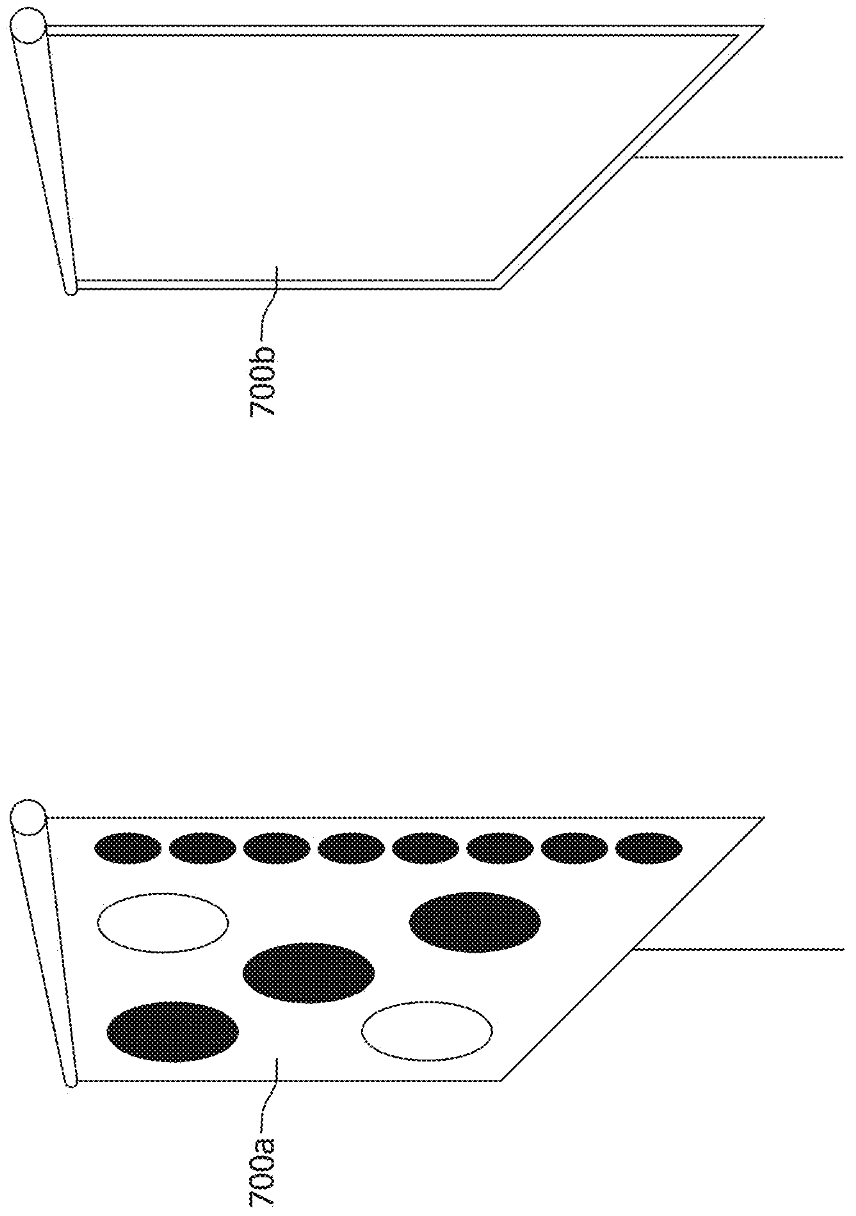
FIG. 7 illustrates another example of a calibration board.

FIG. 7 illustrates another example of a calibration board that can display a calibration pattern 700*a* or no calibration pattern 700*b*. A calibration pattern shown in FIG. 7 as 700*a* is for example only, and accordingly any other calibration pattern may be displayed as well. By way of an example, the calibration pattern shown in FIG. 7 as 700*a* may be converted into the no calibration pattern shown in FIG. 7 as 700*b* using a curtain that can be vertically or horizontally mechanically rolled across the calibration board for hiding a calibration pattern on certain calibration boards.

Figure 8:
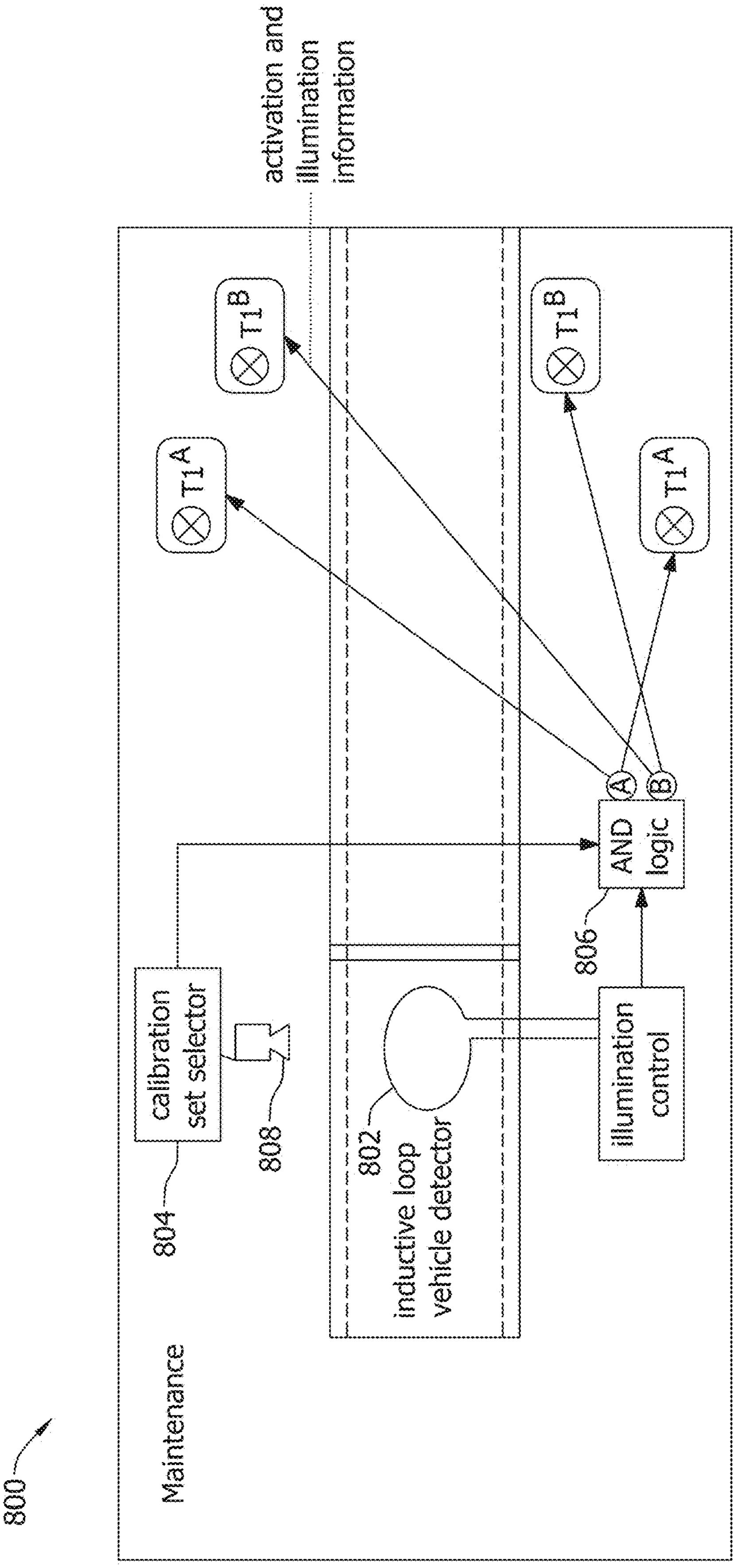
FIG. 8 illustrates an example configuration of a calibration area shown in FIG. 5A or FIG. 5B.

FIG. 8 illustrates an example configuration 800 of the calibration area 500*a* or 500*b*, shown in FIG. 5A or FIG. 5B, respectively. As shown in FIG. 8, the configuration includes an inductive loop vehicle detector that generates a signal when the autonomous vehicle passes over the inductive loop vehicle detector 802 or stops within an area over the inductive loop vehicle detector 802. The inductive loop vehicle detector 802 activates a plurality of calibration boards such as 504*a*-504*f*, shown in FIG. 5A, or 504*a*-504*h*, shown in FIG. 5B.

Additionally, a calibration set selector 804 and a control circuit 806 may activate a subset of the plurality of calibration boards 504*a*-504*f* shown in FIG. 5A or 504*a*-504*h* shown in FIG. 5B by illuminating the subset of calibration boards either through external or internal lighting. In FIG. 8, calibration boards are shown with labels $T1^A$, $T1^B$, etc. By way of an example, the subset of the plurality of calibration boards (for example, an alternative calibration board on each side of the calibration track, or calibration boards on one side of the calibration track) may be activated based upon the type or the model of the autonomous vehicle as detected using a machine-readable code, such as, for example, a quick response (QR) code, displayed on the autonomous vehicle, using a sensor 808 positioned in the calibration area. The sensor 808 positioned in the calibration area for detecting the machine-readable code may be a camera device, and the machine-readable code may be, for example, a QR Code, a barcode, or an alphanumeric code.

Figure 9:
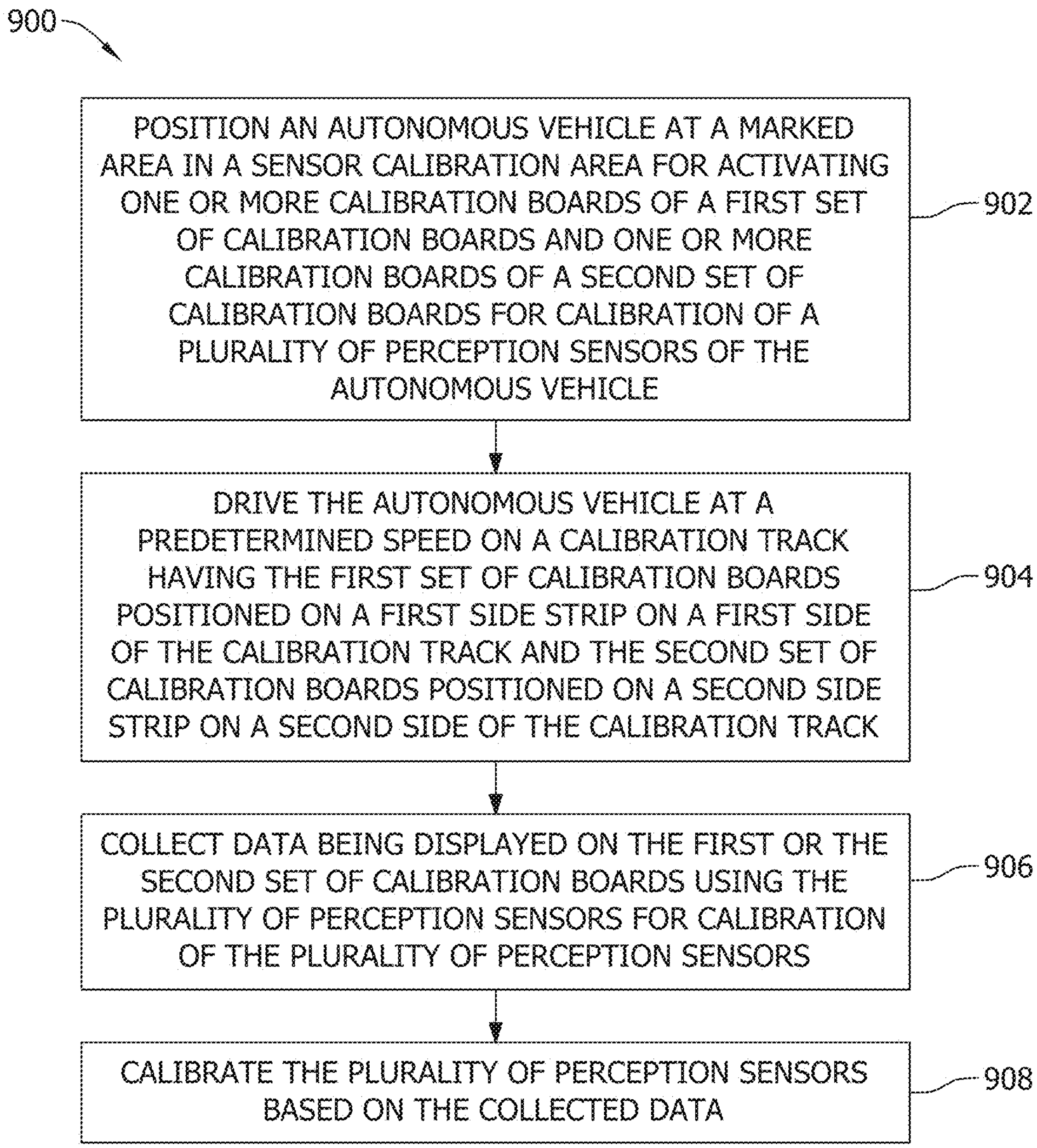
FIG. 9 is a flow-chart of an example method of calibrating a plurality of perception sensors of an autonomous vehicle.

FIG. 9 illustrates a flow-chart of an example method 900 of calibrating a plurality of perception sensors of an autonomous vehicle. The plurality of perception sensors includes, for example, one or more LiDAR sensors, one or more RADAR sensors, one or more imaging sensors, such as cameras. The one or more imaging sensors include one ore more NIR camera sensors, one or more SWIR camera sensors, one or more LWIR camera sensors, or one or more thermal camera sensors. A perception sensor of the plurality of perception sensors may be positioned on the autonomous vehicle in the front, on the side, or in the back of the autonomous vehicle.

The method 900 includes positioning 902 the autonomous vehicle at a marked area in a sensor calibration area. The marked area in the sensor calibration area may include, for example, an autonomous vehicle detector circuit such as an inductive loop vehicle detector 802 shown in FIG. 8. Upon positioning the autonomous vehicle at the marked area, or when the autonomous vehicle passes over the inductive loop vehicle detector 802, or upon bringing the autonomous vehicle in a fully stopped position within an area over the inductive loop vehicle detector 802, the autonomous vehicle detector circuit generates a signal that activates one or more calibration boards of a first set of calibration boards (e.g., calibration boards 504*a*, 504*c*, 504*e*, and/or 504*g* shown in FIGS. 5A-5B) and one or more calibration boards of a second set of calibration boards (e.g., calibration boards 504*b*, 504*d*, 504*f*, and/or 504*h* shown in FIGS. 5A-5B).

The first set of calibration boards may be positioned on a first side strip and the second set of calibration boards may be positioned on a second side strip. The first side strip may be longitudinally extending on one side of the calibration track, and the second side strip may be longitudinally extending on another side (or a second side) of the calibration track. The calibration track extends over a longitudinal length in the sensor calibration area. Each calibration board of the first set of calibration boards is positioned apart from other calibration boards of the first set of calibration boards. Similarly, each calibration board of the second set of calibration boards is positioned apart from other calibration boards of the second set of calibration boards.

Further, each calibration board of the first set of calibration boards or the second set of calibration boards is positioned at a different distance away from the calibration track such that one calibration board does not obstruct any other calibration board from a starting location of the calibration track. Additionally, each calibration board of the first set of calibration boards or the second set of calibration boards is positioned in a vertical standing position or a horizontal laying position. A calibration board of the first set of calibration boards or the second set of calibration boards may have a specific pattern, for example, a checkerboard box pattern.

Further, the calibration board may include a machine-readable image identifying a current location of the sensor calibration area and/or a calibration track number. The machine-readable image may be displayed or printed on the calibration board. The calibration board may also have one or more targets for calibrating a LiDAR sensor or a RADAR sensor mounted on the autonomous vehicle. The calibration board may thus be used for calibrating an imaging sensor mounted on the autonomous vehicle. The imaging sensor may be a near infrared (NIR) camera sensor, a short-wave infrared (SWIR) camera sensor, or a long wave infrared (LWIR) camera sensor, or a thermal camera sensor.

The method 900 includes driving 904 the autonomous vehicle at a predetermined speed on a calibration track having the first set of calibration boards on the first side strip on one side of the calibration track and the second set of calibration boards on the second side strip on another side of the calibration track. As stated herein, the calibration track is in the sensor calibration area. The method 900 includes collecting 906 data for calibration of the plurality of perception sensors. The data is collected using the plurality of perception sensors.

The method 900 includes calibrating 908 the plurality of perception sensors based on the collected data. The collected data from the plurality of perception sensors is used in a comprehensive calibration process that ensures mutual stabilization across the different sensors. The calibration method involves solving a global optimization problem, where the known positions and orientations of the sensors, along with the expected and measured values from the calibration boards, are jointly utilized. For imaging sensors, such as cameras, the data captured from the calibration boards (e.g., checkerboard patterns or QR codes) is used to adjust intrinsic parameters (like the camera's intrinsic matrix and distortion coefficients) and extrinsic parameters (position and orientation). Similarly, for LiDAR sensors, the data is used to refine the generated point cloud by aligning and correcting distance measurements based on the feedback from reflective markers on the calibration boards. For RADAR sensors, the data is utilized to verify and correct range and angle measurements for the RADAR sensors, and ensuring that detected objects align with the expected positions of the markers 406 on the calibration boards.

The calibration process is inherently interdependent, where the adjustments for one sensor type are influenced by and contribute to the calibrations of the other sensors. This mutual stabilization is achieved by integrating all sensor data into a heavily constrained global optimization framework. The optimization process, as described herein, is designed to minimize the overall error across the entire sensor set, considering both their spatial arrangements and their semantic interpretations of the environment. Further, the described approach ensures that the entire suite of perception sensors is calibrated to achieve the minimum possible error in their collective functionality, enabling a highly precise and reliable sensor fusion for the autonomous vehicle.

Accordingly, a flexible calibration track as described herein provides many advantages including, but not only limited to, an ability to accommodate autonomous vehicles from many different manufacturers having a diverse sensor set configurations or sensor set generations without requiring a larger fixed space that is dedicated for a sensor calibration operation. Further, the calibration boards can be illuminated independent of the day light or night light conditions. In addition, position of the calibration boards can be easily adapted based on the size of the autonomous vehicle or the model of the autonomous vehicle. Further, the calibration area, as described herein, can be scaled, or modified to meet any new requirements including changing positions of the calibration boards or a new calibration pattern being illuminated for a custom testing protocol for different driving situations.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, afield programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DV D, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A sensor calibration area comprising:

a calibration track extending over a longitudinal length and on which an autonomous vehicle can operate;

a first side strip extending longitudinally on a first side of the calibration track;

a second side strip extending longitudinally on a second side of the calibration track;

a first set of calibration boards positioned on the first side strip;

a second set of calibration boards positioned on the second side strip;

an autonomous vehicle detector circuit configured to detect presence of the autonomous vehicle and generate a signal indicating the presence of the autonomous vehicle;

a sensor to determine a type of the autonomous vehicle; and a calibration board selector circuit configured to activate at least one calibration board of the first set of calibration boards or at least one calibration board of the second set of calibration boards for calibration of a plurality of perception sensors mounted on the autonomous vehicle.

2. The sensor calibration area of claim 1, wherein each calibration board of the first set of calibration boards is positioned apart from other calibration boards of the first set of calibration boards and each calibration board of the second set of calibration boards is positioned apart from other calibration boards of the second set of calibration boards.

3. The sensor calibration area of claim 2, wherein each calibration board of the first set of calibration boards or the second set of calibration boards is positioned at a different distance away from the calibration track such that one calibration board does not obstruct any other calibration board from a starting location of the calibration track.

4. The sensor calibration area of claim 1, wherein each calibration board of the first set of calibration boards or the second set of calibration boards is positioned in a vertical standing position.

5. The sensor calibration area of claim 1, wherein each calibration board of the first set of calibration boards or the second set of calibration boards is positioned in a horizontal laying position.

6. The sensor calibration area of claim 1, wherein a calibration board of the first set of calibration boards or the second set of calibration boards includes a checkerboard box pattern.

7. The sensor calibration area of claim 6, wherein the calibration board includes a machine-readable image identifying a current location of the sensor calibration area and/or a calibration track number.

8. The sensor calibration area of claim 1, wherein a calibration board of the first set of calibration boards or the second set of calibration boards is equipped with one or more targets for calibrating a light detection and ranging sensor mounted on the autonomous vehicle.

9. The sensor calibration area of claim 1, wherein a calibration board of the first set of calibration boards or the second set of calibration boards is equipped with one or more targets for calibrating a radio detection and ranging sensor mounted on the autonomous vehicle.

10. The sensor calibration area of claim 1, wherein a calibration board of the first set of calibration boards or the second set of calibration boards is configured for calibrating an imaging sensor mounted on the autonomous vehicle.

11. The sensor calibration area of claim 10, wherein the imaging sensor is a near infrared (NIR) camera sensor, a short-wave infrared (SWIR) camera sensor, or a long wave infrared (LWIR) camera sensor.

12. An autonomous vehicle comprising:

a plurality of perception sensors;

at least one memory configured to store machine-executable instructions; and at least one processor communicatively coupled with the at least one memory and configured to execute the machine-executable instructions to:

stop the autonomous vehicle at a marked area in a sensor calibration area for activating one or more calibration boards of a first set of calibration boards and one or more calibration boards of a second set of calibration boards to calibrate the plurality of perception sensors;

drive the autonomous vehicle at a predetermined speed on a calibration track having the first set of calibration boards positioned on a first side strip on a first side of the calibration track and the second set of calibration boards positioned on a second side strip on a second side of the calibration track, wherein the calibration track is in the sensor calibration area;

collect data being displayed on the first or the second set of calibration boards using the plurality of perception sensors for calibration of the plurality of perception sensors; and calibrate the plurality of perception sensors based on the collected data.

13. The autonomous vehicle of claim 12, wherein the data collected for calibration of the plurality of perception sensors include a machine-readable image displayed or printed on the calibration board, wherein the machine-readable image is used for identifying a current location of the sensor calibration area and/or a calibration track number.

14. The autonomous vehicle of claim 12, wherein the plurality of perception sensors includes a light detection and ranging sensor, and wherein the data collected for calibration of the plurality of perception sensors include information of one or more targets for calibrating the light detection and ranging sensor.

15. The autonomous vehicle of claim 12, wherein the plurality of perception sensors includes a radio detection and ranging sensor, and wherein the data collected for calibration of the plurality of perception sensors include information of one or more targets for calibrating the radio detection and ranging sensor.

16. The autonomous vehicle of claim 12, wherein the plurality of perception sensors includes an imaging sensor, and wherein the data collected for calibration of the plurality of perception sensors include information for calibrating the imaging sensor.

17. The autonomous vehicle of claim 16, wherein the imaging sensor is a near infrared (NIR) camera sensor, a short-wave infrared (SWIR) camera sensor, or a thermal camera sensor.

18. A computer-implemented method comprising:

positioning an autonomous vehicle at a marked area in a sensor calibration area for activating one or more calibration boards of a first set of calibration boards and one or more calibration boards of a second set of calibration boards for calibration of a plurality of perception sensors of the autonomous vehicle;

driving the autonomous vehicle at a predetermined speed on a calibration track in the sensor calibration area having the first set of calibration boards positioned on a first side strip on a first side of the calibration track and the second set of calibration boards positioned on a second side strip on a second side of the calibration track;

collecting data being displayed on the first or the second set of calibration boards using the plurality of perception sensors for calibration of the plurality of perception sensors; and calibrating the plurality of perception sensors based on the collected data.

19. The computer-implemented method of claim 18, wherein the data collected for calibration of the plurality of perception sensors include a machine-readable image displayed or printed on the calibration board, and the computer-implemented method further comprising identifying a current location of the sensor calibration area and/or a calibration track number using the machine-readable image.

20. The computer-implemented method of claim 18, wherein the plurality of perception sensors includes one or more light detection and ranging sensors, one or more radio detection and ranging sensors, and one or more imaging sensors.

* * * * *